United States Patent [19]

Wanchoo et al.

[11] Patent Number: 4,713,622

[45] Date of Patent: Dec. 15, 1987

[54] MULTIPLE STATE TONE GENERATOR

[75] Inventors: Sanjay Wanchoo, Lauderhill; David L. Muri, Sunrise, both of Fla.

[73] Assignee: Motorola Inc., Schaumburg, Ill.

[21] Appl. No.: 917,587

[22] Filed: Oct. 9, 1986

[51] Int. Cl.⁴ .............................................. G01H 5/06

[52] U.S. Cl. ...................................... 328/61; 377/114; 328/14; 328/30; 328/186; 307/227

[58] Field of Search .................. 328/14, 154, 186, 61, 328/28, 30; 307/227; 377/114

[56] References Cited

U.S. PATENT DOCUMENTS

| | | | |
|---|---|---|---|
| 2,798,155 | 7/1957 | Valeton | 328/186 |
| 3,215,860 | 11/1965 | Neumann | 328/186 |
| 3,525,941 | 8/1970 | Smith | 328/186 |
| 3,579,081 | 5/1971 | Bates | 328/186 |
| 3,626,076 | 12/1971 | Uchiyama | 377/114 |
| 3,651,338 | 3/1972 | Swan, Jr. et al. | 307/227 |
| 3,654,558 | 4/1972 | Tomisawa | 307/227 |
| 3,660,766 | 5/1972 | Hilliard | 328/61 |
| 3,714,461 | 1/1973 | Dodson | 307/227 |
| 3,735,269 | 5/1973 | Jackson | 328/14 |
| 3,992,680 | 11/1976 | Herzl | 328/14 |
| 4,222,008 | 9/1980 | Mezrich | 328/28 |
| 4,328,554 | 5/1981 | Mantione | 328/14 |
| 4,368,433 | 1/1983 | Imazeki et al. | 328/14 |
| 4,446,436 | 5/1984 | Ireland | 328/14 |

*Primary Examiner*—John S. Heyman
*Attorney, Agent, or Firm*—Daniel K. Nichols; Joseph T. Downey; Mark P. Kahler

[57] ABSTRACT

A tone generator for producing a plurality of output tone waveforms for a plurality of frequencies, includes an encoder for selectively generating a first waveform that has a first number of states and second waveform that has a second number of states which are less than the first number of states. A control circuit is connected to the encoder and selects the second waveform for higher frequency output tones and the first waveform for lower frequency output tones. The control circuit provides a control clock signal to the encoder for determining the frequency of the output tones. A low pass filter is connected to the encoder for filtering the output tones. The encoder includes a plurality of flip flips having outputs connected to a summer by gates that are actuated by the control circuit.

7 Claims, 14 Drawing Figures

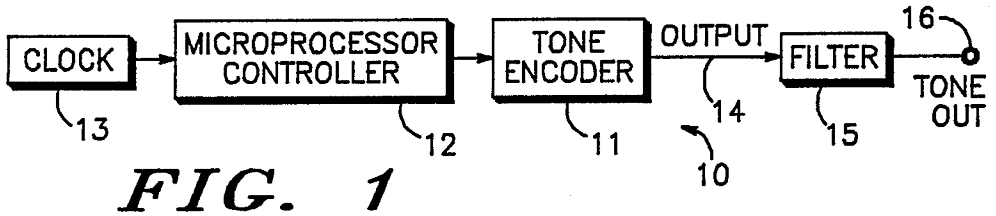
FIG. 1
FIG. 2
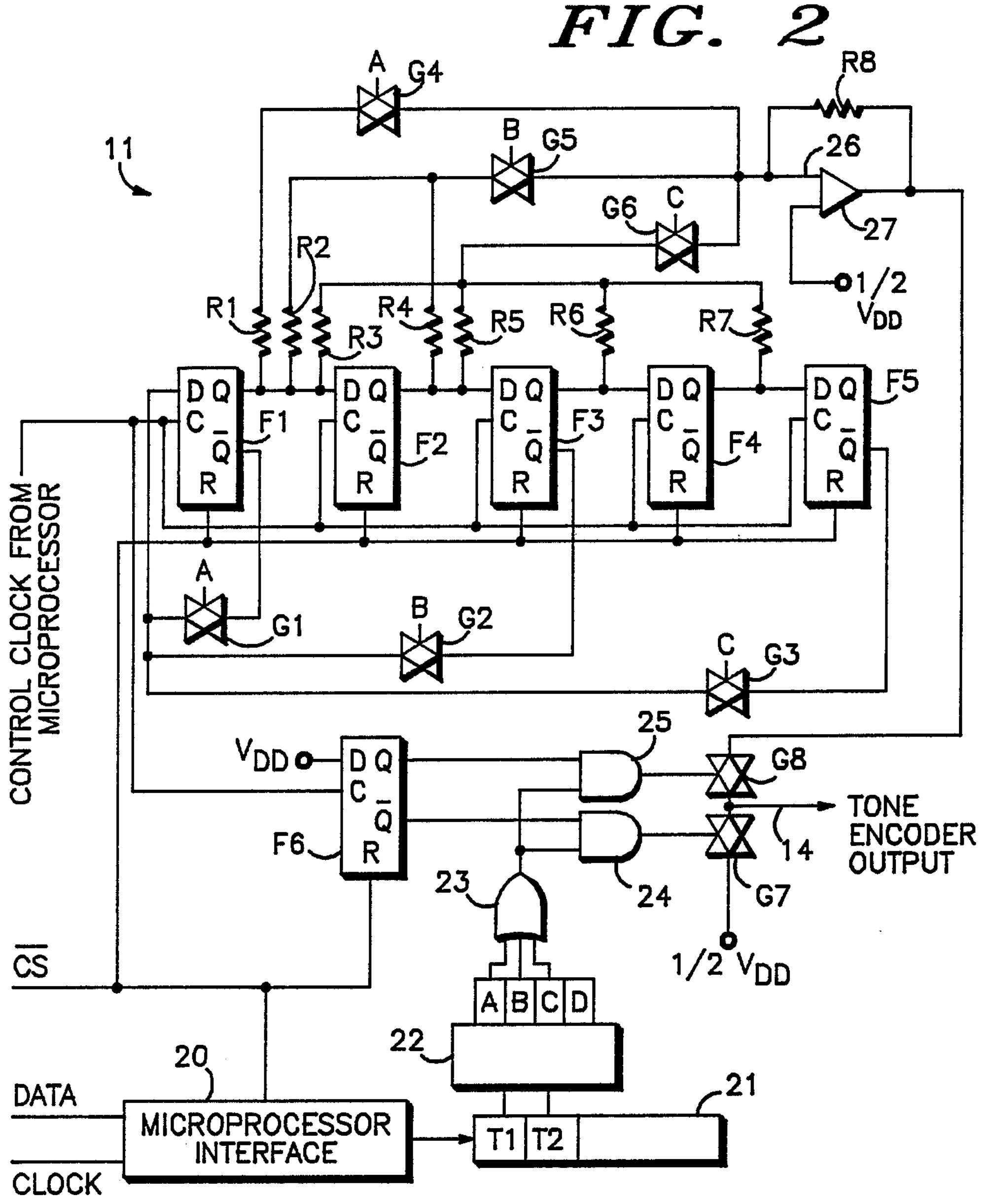

TONE GENERATOR TIMING DIAGRAM FOR 2 STATE

MULTIPLE STATE TONE GENERATOR

BACKGROUND OF THE INVENTION

This invention relates to tone generators in general and particularly to tone generators which generate step waveforms for producing tone signals. Prior tone generators are constructed to generate the same waveform regardless of the frequency of the tone to be generated. For example, a two-state or two-level square wave can be generated. Such a two-state waveform is however rich in low order harmonics. Waveforms having three or more states are substantially free from lower order harmonics. With increased numbers of states of a waveform, additional harmonics are suppressed. However, the clock frequency required for operation of the control switching circuitry of the tone generator increases directly with the other number of states of the output waveform. The use of a three or more state tone signal at higher frequencies may be undesirable due to the necessarily high clock frequencies required to operate the control circuitry.

SUMMARY OF THE INVENTION

This tone generator provides output tone waveforms having suppressed harmonics below a predetermined frequency while operating at relatively low clock frequencies over the full range of tone outputs.

In one aspect of the invention, a tone generator, which is capable of producing a plurality of output frequency tones, includes an encoder means or encoder for selectively generating one of a plurality of output waveforms, and control means operatively actuating the encoder means for selecting one of the plurality of output waveforms. The control means selects one output waveform for a first frequency tone and a second output waveform for a second frequency tone.

In another aspect of the invention, a filter means is connected to the encoder means for filtering the output waveforms. The filter means is a low pass filter having a predetermined cut-off frequency.

In still another aspect of the invention, the encoder means selectively generates a first waveform having a first number of states and a second waveform having a second number of states less than the first number of states. The control means selects the second waveform for higher frequency output tones and the first waveform the lower frequency output tones.

In yet another aspect of the invention, the control means includes a control clock means for providing a control clock signal to the encoder for determining the frequency of the output tones.

In a further aspect of the invention, the encoder selectively generates a third waveform having a number of states less than the second number of states and the control means selects the third waveform for output tones having frequencies greater than the aforesaid higher frequency.

In yet another aspect of the invention, the encoder includes a summer means and a plurality of flip-flops that have their outputs selectively connected to the summer means. For the first waveform at least three flip-flops are connected to the summer means, for the second waveform at least two flip-flops are connected to the summer means, and for the third waveform at least one flip-flop is connected to the summer means. In still another aspect of the invention, the encoder includes a plurality of gates which are selectively actuated by the control means for connecting the flip-flops to the summer means.

In another aspect of the invention, a method of generating a plurality of tone outputs includes selectively generating a first waveform having a first number of states for tone frequencies of a lower frequency range and selectively generating a second waveform having a second number of states less than the first number of states for tone frequencies of a higher frequency range.

In another aspect of the invention, the method includes the further step of filtering the waveforms with a low pass filter having a fixed cut-off frequency. In still another aspect of the invention, the method includes selectively generating a third waveform having a third number of states less than the first number of states for tone frequencies greater than the aforesaid higher frequency range.

BRIEF DESCRIPTION OF THE DRAWINGS

FIG. 1 is a block diagram of a tone generator that may be utilized to practice the present invention.

FIG. 2 is an electrical schematic diagram of the tone encoder of FIG. 1.

DESCRIPTION OF THE PREFERRED EMBODIMENT

Figure 3A:
FIGS. 3A–D are timing diagrams for two-state tone generation.

Referring now by characters of reference to the drawings and first to FIG. 1, it will be understood that the tone generator indicated generally by 10 includes a tone encoder 11 constituting encoder means for producing output tone waveforms. The tone encoder 11 is connected to and operatively controlled by a microprocessor controller 12 constituting control means. The microprocessor controller 12 is connected to a clock 13 which provides a reference clock signal. The tone encoder 11 has an output 14 that is connected to a filter 15, comprising fixed filter means. Filtered tone signals are available at a filter output 16. In the preferred embodiment, filter 15 comprises a low pass filter having cut-off frequency of 3 kHz. The cut-off frequency of low pass filter 15 is chosen to be higher than the highest tone frequency to be generated.

The tone encoder 11, of FIG. 2, is capable of providing a plurality of waveforms for generating desired tone signals. The microprocessor controller 12 includes a microprocessor interface 20 that receives data, clock, and CS bar control signals from the microprocessor controller 12. This clock signals correspond to the reference clock 13 while the data signals are used to designate the number of states for the tone waveforms. The output of microprocessor interface 20 is coupled to a register 21. Two bits of information, namely, bits T1 and T2 are provided for controlling the number of states of the tone encoder 11. The bits T1 and T2 of register 21 are provided to a one of four decoder 22 having outputs A, B, C, and D. Output A corresponds to a two-state tone waveform, output B corresponds to a three-state waveform and output C to a five-state waveform. Outputs A, B, and C are connected to various transmission gates, as is described below, as well as to inputs of an OR gate 23.

A plurality of type D flip flops F1–F5 are provided. Each of the flip-flops F1–F5 has a D input, a C or clock input, an R bar reset input, a Q output, and a Q bar output. Each of the C inputs of flip-flops F1–F5 are connected to a control clock line from microprocessor controller 12 which further comprises control clock means. Each of the R bar inputs of flip-flops F1–F5 are connected to the CS bar control line. The Q output of flip-flop F1 is connected to the input D of flip-flop F2, while the Q bar output of flip-flop F1 is connected by a gate G1 back to the D input of flip-flop F1. Gate G1 is controlled by the A output of decoder 22. The Q output of flip-flop F2 is connected to the D input of flip-flop F3 while the Q output of flip-flop F3 is connected to the D input of flip-flop F4. The Q bar output of flip-flop F3 is connected, via transmission gate G2, to the D input of flip-flop F1. Gate G2 is controlled by the output B of decoder 22. The Q output of flip-flop F4 is connected to the D input of flip-flop F5 which has its Q bar output connected, via transmission gate G3, back to the D input of flip-flop F1. Gate G3 is controlled by the C output of decoder 22.

Resistors R1, R2, and R3 are each connected to the Q output of flip-flop F1. Resistor R1 is serially connected by a gate G4, controlled by the A output of decoder 22, to an inverting input 26 of an amplifier 27. Resistor R2 is connected between the Q output of flip-flop F1 and the input of a gate G5 that is controlled by the B output of decoder 22. A resistor R4 is connected between the Q output of flip-flop F2 and the input of gate G5. The output of gate G5 is connected to the input 26 of amplifier 27. Resistor R3 is connected between the Q output of flip-flop F1 and the input of a gate G6, which is controlled by the C output of decoder 22. Also connected to the input of gate G6 are a resistor R5 connected between the Q output of flip-flop F2 and the gate input, a resistor R6 connected between the Q output of flip-flop F3 and the gate input and a resistor R7 connected between the Q output of flip flop F4 and the gate input. The output of gate G6 is connected to input 26 of amplifier 27, comprising summer means.

A resistor R8 is connected between the output of amplifier 27 and its inverting input 26 in a conventional manner. The amplifier 27 has its non-inverting input connected to a voltage source supplying a voltage equal to one-half $V_{DD}$. The output of amplifier 27 is connected to gate G8 which has its output connected to the output 14 of the tone encoder. Also connected to the output 14 of the tone encoder is a gate G7 that has its input connected to a voltage source supplying voltage equal to one half $V_{DD}$. When no current is either supplied or sunk from input 26, the output of amplifier 27 is approximately 2.5 volts. When current is supplied to input 26, the output voltage drops. When current is sunk from input 26, the output voltage rises.

Gate G8 is controlled by the output of a dual input AND gate 25 that has one input connected to the output of OR gate 23. Gate G7 is controlled by a dual input AND gate 24 that also has one of its inputs connected to the output of OR gate 23. A type D flip-flop F6 has its Q output connected to the other input of AND gate 25 and is Q bar output connected to the other input of AND gate 24. The D input of flip-flop F6 is connected to $V_{DD}$, which is the system operating voltage, i.e. five volts in the preferred embodiment. Its C or clock input is connected to the control clock line from the microprocessor controller 12, and its R bar reset input is connected to the CS bar control line.

It is thought that the features and functional advantages of the multiple state tone generator 10 have become fully apparent from the foregoing description of parts, but for completeness of disclosure a description of the operation of the tone generator will be given.

Figure 3C:
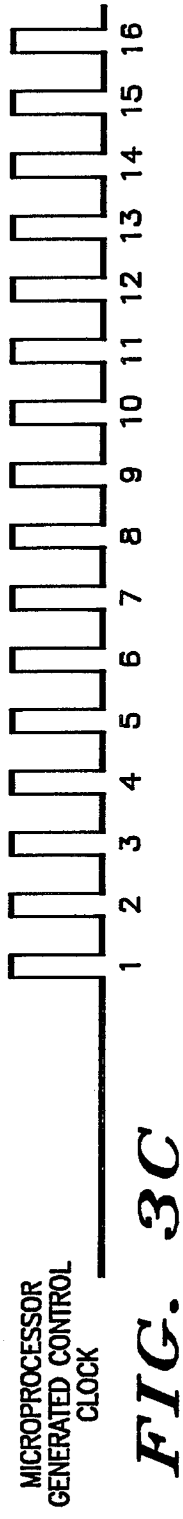
Figure 3D:
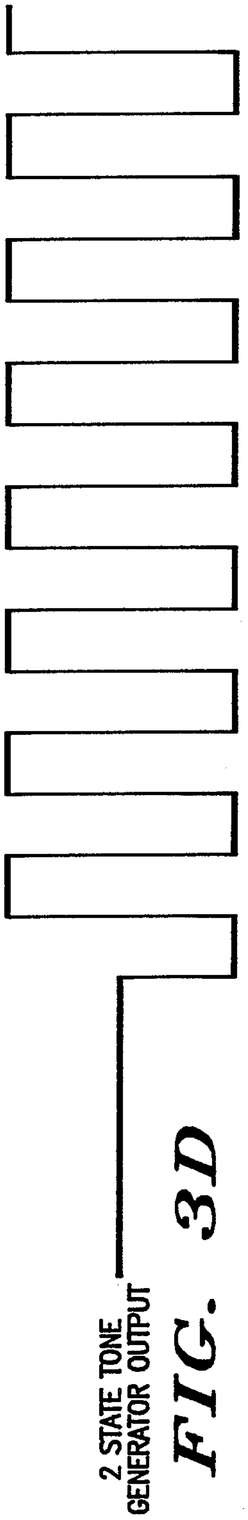
Figures 4A, 4B, 4C, 4D:
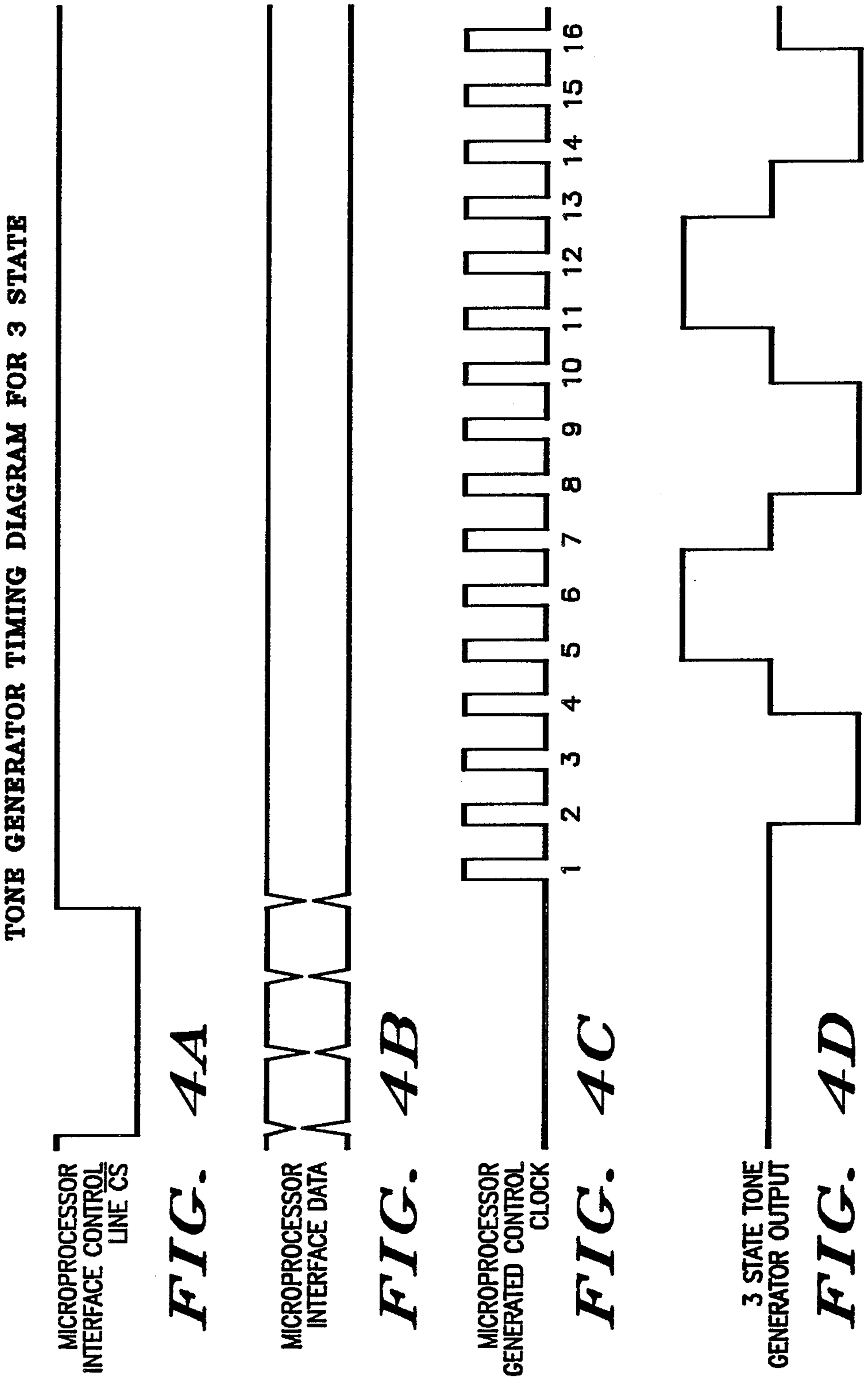
FIGS. 4A–D are timing diagrams for three-state tone generation.
Figures 5A, 5B, 5C, 5D:
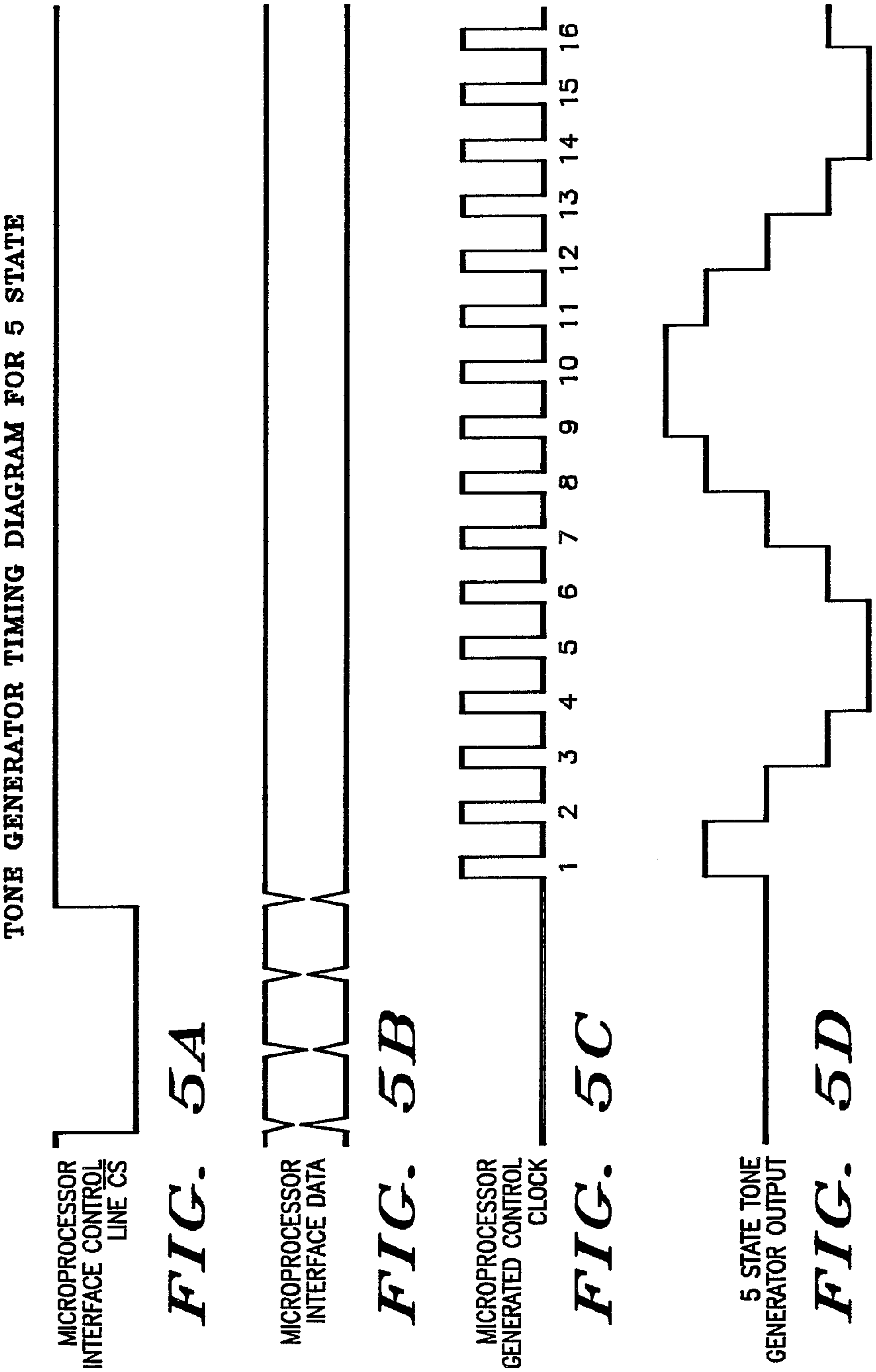
FIGS. 5A–D are timing diagrams for five-state tone generation.

The microprocessor controller 12 provides predetermined signals to the tone encoder 11 depending upon the desired tone encoder output frequency. These signals include the microprocessor interface control output, indicated by CS bar, which is illustrated in FIGS. 3A, 4A, and 5A. The CS bar control signal is provided in order to condition the encoder 11 to produce the desired number of steps or states of the output waveform signal and to reset the encoder 11 to begin generation of tone signals. The micro-processor 12 also divides the signal from the clock 13 to provide the necessary control clock signal for the desired output tone, which is applied to the C inputs of flip-flops F1–F6. The necessary control clock signal for the output tone is a predetermined multiple of the frequency of the desired output tone. For the two-state waveform tone, the control clock signal from the microprocessor control clock means must equal twice the frequency of the tone output. This can be seen by comparing the clock pulses in FIG. 3C with the waveform drawing in FIG. 3D. For the three-state waveform tone, the control clock signal must equal six times the output frequency as seen in FIGS. 4C and 4D. For the five-state waveform tone, the control clock must be ten times the frequency of the output tone.

Figure 3B:
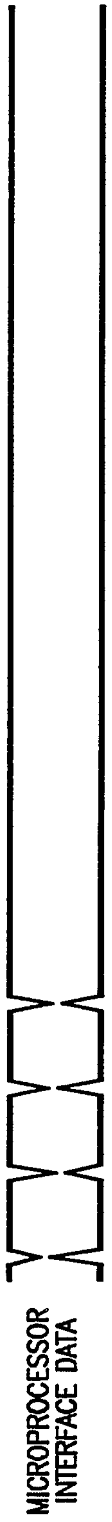

The microprocessor controller 12 also provides the bits T1 and T2 that are used for actuation of gates G1–G6. This is accomplished by providing a data signal, as represented in FIGS. 3B, 4B, and 5B, which is clocked into the register 21 using the clock 13 signal of the microprocessor interface 20. The two bits of binary information designated as T2 and T1 are decoded by decoder 22. For example, if T1 and T2 equal 00 then decoder 22 actuates output A high. If T1 and T2 are equal to 01 then decoder output B is high. If the bits T1 and T2 are equal to 10 then decoder output C is high while if the bits T1 and T2 are both high, then output D of decoder 22 is high.

In operation, when the CS bar control signal goes low, it initiates the resetting of tone encoder 11. The CS bar control signal resets flip-flops F1–F6, causing the Q outputs to go low and their Q bar outputs to go high. The CS bar control signal enables the microprocessor interface 20 for allowing clocking of the data word into register 21. Once the data word has been loaded into register 21, bits T1 and T2 decoded by decoded 22 and an appropriate output A, B, or C as selected goes high, causing the output of gate 23 to go high. Since flip-flop F6 has been reset, its Q bar output is high thereby making the output of AND gate 24 go high to turn on gate G7 and initialize the tone encoder output line 14 at one half of $V_{DD}$, the voltage midpoint of the waveform to be generated. The output of amplifier 27 at this point is low regardless of which of the gates G4, G5, and G6 are actuated since all of the Q outputs of flip-flops F1–F5 are low.

The encoding of the individual waveforms will now be discussed. Referring first to a two-state waveform illustrated in FIG. 3D, the A output of decoder 22 is actuated as previously discussed, thereby actuating gates G1 and G4. The tone encoder 10 is now ready to begin generation of a two-state output waveform. This is accomplished by providing the microprocessor generated control clock pulses to clock flip-flops F1–F5. The first clock pulse, illustrated in FIG. 3C, causes the Q output of flip-flop F1 to go high, since its D input is connected via gate G1 to its Q bar output which was high, thereby supplying current through resistor R1 and gate G4 to the inverting input 26 of amplifier 27.

Simultaneously, the first clock pulse causes the Q output of flip-flop F6 to go high and its Q bar output to go low since its D input is connected to $V_{DD}$. This results in the output of AND gate 24 going low and the output of AND gate 25 going high, thereby connecting the tone encoder output 14 to the output of amplifier 27, and disconnecting it from the one half $V_{DD}$ source. This output of flip-flop F6 and the condition of gates G7 and G8 remain while the current waveform signal is generated.

It will be understood that, while the outputs of flip-flops F2–F5 may change during the generation of the two-state wave, their outputs will not effect the generation of the tone encoder output signal, since their outputs are isolated from the amplifier 27 by gates G5 and G6 which are OFF.

On the second control clock pulse, the Q output of flip-flop F1 goes low causing the output waveform to go high, since the Q bar output of flip-flop F1 is coupled back to its input. It will be appreciated that on each consecutive pulse from the microprocessor generated clock, the Q output of flip-flop F1 toggles producing the two-step waveform illustrated in FIG. 3D. The value of resistor R1 is chosen to be a sufficiently low value of resistance to allow current from the Q output of flip-flop F1 to drive the amplifier 27 to approximately 1.5 volts. When the Q output goes low, it sinks sufficient current to allow the output of amplifier 27 to go to approximately 3.5 volts.

To discontinue tone generation, the control clock pulses from the microprocessor controller 12 are simply stopped. Loading bits 11 into T1 and T2 of register 21 causes the D output of decoder 22 to go high thereby causing both of the gates G7 and G8 to be off and allowing the output 14 to float.

For the three-state waveform form of FIG. 4D, decoder 22 output B is actuated to go high to turn on gates G5 and G2. The first control clock pulse, illustrated in FIG. 4C, results again in the turning off of gate G7 and the turning on of gate G8. The Q output of flip-flop F1 goes high while the Q output of flip-flop F2 remains low.

On the second clock pulse, the output Q of output flip-flop F1 remains high, since its D input is connected to the Q bar output of flip-flop F3. At this time, the Q output of flip-flop F2 goes high since its D input is connected to the Q output of flip-flop F1 which was high. The value of resistors R4 is equal to that of resistor R2 to provide an equal amount of current so that the current from resistors R2 and R4 combine to cause the output voltage of amplifier 27 to go to approximately 1.5 volts. Amplifier 27 acts as a summer providing a voltage at its output which is determined by the net currents from flip-flops F1 and F2.

On the third control clock pulse, the Q outputs of flip-flops F1 and F2 remain high while the Q output of flip-flop F3 goes high and the outputs of flip-flops F1 and F2 again combine to maintain an output voltage from amplifier 27 at approximately 1.5 volts. It will be appreciated that, for the three state waveform flip-flops F4 and F5 do not effect output waveform.

On control clock pulse four, flip-flops F2 and F3 remain high while the Q output of flip-flop F1 goes low since its D output is connected to the Q bar output of flip-flop F3. Flip-flop F1 then sinks the current equal to that supplied by flip-flop F2 causing the output of amplifier to return to 2.5 volts.

On the fifth control clock pulse, the Q output of flip-flop F2 goes low, thereby causing flip-flops F1 and F2 to sink current from the input 26 driving the output of amplifier 27 to 3.5 volts. On control clock pulse 6, both the Q outputs of flip-flops F1 and F2 remain low and the Q bar output of flip-flop F3 goes high. Then at control clock pulse number 7, the Q output of flip-flop F1 goes high causing the output voltage from the amplifier 27 to go back to 2.5 volts and starting the second waveform repetition. This sequence continues as long as the control clock signals are provided to actuate flip-flops F1–F3.

For the five-state waveform, the C output of decoder 22 is high thereby actuating gates G3 and G6 ON. In this case, the D input of flip-flop F1 is provided by the Q bar output of flip-flop F5. Resistors R3 and R7 are equal in value as are resistors R5 and R6. Flip-flops F1 and F4 supply and sink equal amounts of current as do flip-flops F2 and F3. Amplifier 27 sums the net currents from flip-flops F1–F4 producing an inverted output waveform.

In operation, the first control clock pulse, illustrated in FIG. 5C, causes the Q output of flip-flop F1 to go high. Flip-flop F4 sinks the amount of current supplied by flip-flop F1 while flip-flops F2 and F3 sink equal amounts of current causing the output of amplifier 27 to go to approximately 3.118 volts. On the second control clock pulse, the Q outputs of flip-flops F1 and F2 are both high while flip-flops F3 and F4 are low. The net current supplied by the flip-flops F1–F4 to amplifier 27 is zero, and its output goes to 2.5 volts. On the third clock pulse, the Q outputs of flip-flops F1, F2 and F3 are high while flip-flop F4 is low. Flip-flops F2 and F3 effectively supply the net current to amplifier 27 causing its output to go to 1.882 volts. On the fourth clock pulse, the Q outputs of flip-flops F1–F4 are all high and their currents are summed to drive the output at amplifier 27 to 1.5 volts. On the fifth control clock pulse, the Q outputs of flip-flops F1–F5 are high and the tone waveform output remains at 1.5 volts.

On the sixth control clock pulse, the Q output of flip-flop F1 now goes low causing the tone waveform to return to approximately 1.882 volts. On the seventh clock pulse, the Q outputs of both flip-flops F1 and F2 are low and the tone output waveform is at 2.5 volts, one-half $V_{DD}$, with no net current from flip-flops F1–F4. On the eight control clock pulse, the Q outputs of flip-flops F1–F3 are low causing the tone waveform to rise to approximately 3.118 volts with flip-flops F2 and F3 effectively sinking current from input 27. On the ninth control clock pulse, the Q outputs of flip-flops F1–F4 are all low causing the tone waveform to rise to approximately 3.5 volts with all of the flip-flops F1–F4 sinking current from input 26. On the 10th control clock pulse, the output of flip-flop F5 goes low and the waveform remains at 3.5 volts. On the 11th control clock pulse, the output of flip-flop F1 again goes high returning the output waveform to the 3.118 volt level and completing one cycle of the tone waveform. The waveform is then repeated as long as the control clock pulses are received by flip-flops F1–F5.

While the three illustrated waveforms are discussed as varying from 1.5 to 3.5 volts, thereby giving 2 volts peak-to-peak output waveforms, these values are a matter of choice. Other values as well as the values of the individual states can be obtained by appropriate selection of the values of $V_{DD}$ and resistors R1–R8.

In the preferred embodiment, the tone encoder 11 is capable of being utilized for generating tone frequencies from 370 to 3000 Hz. For the frequencies from 370 to 749 Hz, five-state tone signals are generated with control clock frequencies from 3700 to 7490 Hz. Since the lowest order significant harmonic from the five-state waveform is the ninth harmonic, the lowest order significant harmonics will be in the range of 3330 to 6741 Hz. These harmonic frequencies fall above the cut-off frequency of filter 15. For the tone frequencies from 750 to 1399 Hz, three state waveforms are generated with control clock frequencies from a 4500 to 8394 Hz. Since lowest significant harmonic is the fifth harmonic, significant harmonics range from 3750 to 6795 Hz. For frequencies from 1400 to 3000 Hz, two-state waveforms are generated with control clock frequencies from 2800 to 6000 Hz. Since their lowest significant harmonic are the third harmonic, the lowest significant harmonics range from 4200 to 9000 Hz.

The filter 15 of the current embodiment is a five pole low pass filter having a 3000 Hz cut-off frequency. The lowest significant harmonics for each tone generated by the tone encoder 11 falls beyond the cut-off frequency of the filter. Consequently, the fixed frequency filter 15 is effective regardless of the particular tone output frequency. All of the desired tone output frequencies can be generated by using a control clock frequency equal to or less than 8394 Hz. It is therefore, not necessary that the microprocessor controller 12 supply a substantially higher frequency control clock signal that would require increased microprocessor time to generate.

While the tone generator 10 has been illustrated as generating output tones from 370 to 3000 Hz, it will be understood that any desired output tone range can be provided. The fixed filter 15 must be chosen to have a cut-off frequency higher than the highest desired output tone. An appropriate number of waveform states are chosen for any desired output frequency to assure that its lowest significant harmonic falls above the filter cut-off frequency, while minimizing the control clock frequency. Where desired, the waveform could also be four-state, or six or more states in addition to the illustrated two, three and five-state waveforms.

We claim as our invention:

1. A tone generator for producing a plurality of output tone waveforms for a plurality of frequencies comprising: means for providing plural binary state waveforms an encoder means for selectively converting said plural binary state waveforms into a first waveform having a first number of multilevel states and a second waveform having a second number of multilevel states, less than said first number of states, control means operatively connected to said encoder for selecting one of said first and second waveforms wherein said control means selects said second waveform for higher frequency output tones and said first waveform for lower frequency output tones.

2. A tone generator as defined in claim 1, in which:

the control means includes control clock means for providing a control clock signal to said encoder for determining the frequency of the output tones.

3. A tone generator as defined in claim 2, in which:

a low pass filter is connected to a said encoder for filtering the output tones.

4. A tone generator as defined in claim 3, in which:

the encoder means selectively further providing a third waveform having a number of multilevel states less than said second number of multilevel states, and the control means selecting said third waveform for output tones having frequencies greater than said higher frequency.

5. A tone generator for producing a plurality of output tone waveforms for a plurality of frequencies comprising:

an encoder for selectively generating a first waveform having a first number of states, a second waveform having a second number of states, less than said first number of states and a third waveform having a third number of states, less than said second number of states, control means operatively connected to said encoder for selecting one of said first, second and third waveforms wherein said control means selects said first waveform for lower frequency output tones, said second waveform for higher frequency output tones and said third waveform for output tones having frequencies greater than said higher frequencies, the control means including control clock means for providing a control clock signal to said encoder for determining the frequency of the output tones, a low pass filter connected to a said encoder for filtering the output tones, the encoder including a summer means and a plurality of flip-flops having outputs selectively connected to the summer means wherein for said first waveform at least three flip-flops are connected to the summer, for said second waveform at least two flip-flops are connected to the summer mean and for said third waveform at least one flip-flop is connected to said summer means.

6. A tone generator as defined in claim 5, in which:

the encoder includes a plurality of gates selectively actuated by the control means for connecting the flip-flops to the summer means.

7. A tone generator as defined in claim 5, in which:

said first waveform has five states, said second waveform has three states and said third waveform has two states.

* * * * *